(12) United States Patent
Nahen et al.

(10) Patent No.: US 12,447,491 B2
(45) Date of Patent: Oct. 21, 2025

(54) FIXTURE TO BE USED IN PVD PROCESSES FOR CYLINDRICAL, ELONGATED SUBSTRATES

(71) Applicant: Oerlikon Surface Solutions AG, Pfäffikon, Pfäffikon (CH)

(72) Inventors: Sebastian Nahen, Grabs (CH); Francesco Macri, Mels (CH); Rudolf Meiler, Schiers (CH)

(73) Assignee: Oerlikon Surface Solutions AG, Pfäffikon, Pfäffikon (CH)

( * ) Notice: Subject to any disclaimer, the term of this patent is extended or adjusted under 35 U.S.C. 154(b) by 584 days.

(21) Appl. No.: 17/630,389

(22) PCT Filed: Jul. 27, 2020

(86) PCT No.: PCT/EP2020/071132
§ 371 (c)(1),
(2) Date: Jan. 26, 2022

(87) PCT Pub. No.: WO2021/018835
PCT Pub. Date: Feb. 4, 2021

(65) Prior Publication Data
US 2022/0282364 A1  Sep. 8, 2022

(30) Foreign Application Priority Data
Jul. 26, 2019  (DE) .................. 102019120259.0

(51) Int. Cl.
*B05B 13/02*  (2006.01)
*C23C 14/50*  (2006.01)

(52) U.S. Cl.
CPC ...... *B05B 13/0292* (2013.01); *B05B 13/0228* (2013.01); *B05B 13/0242* (2013.01); *C23C 14/505* (2013.01)

(58) Field of Classification Search
CPC ....... B25B 11/02; C23C 14/505; C23C 14/50; C23C 14/325; C23C 14/34; B33Y 80/00;
(Continued)

(56) References Cited

U.S. PATENT DOCUMENTS 6,620,254 B2  9/2003  Zaech et al.
2012/0321790 A1*  12/2012  Fang ................. C30B 25/12
                                                                118/500
2013/0071575 A1*  3/2013  Muller ............... C23C 4/134
                                                                414/754

FOREIGN PATENT DOCUMENTS

DE        3330144 A1    3/1984
DE  102004027989 B4 *  5/2007  ........... C23C 14/505
(Continued)

OTHER PUBLICATIONS

Machine Translation DE 102004027989B4 (Year: 2007).*
Machine Translation (DE 102013012717A1) (Year: 2015).*

*Primary Examiner* — Tyrone V Hall, Jr.

(57) ABSTRACT

A fixture system to be used in a vacuum chamber (16) of a vacuum treatment system, comprising, a spindle (1), a gear wheel, in this text referred to as sun wheel (2), a cylindrical object exhibiting properties that allow the gear wheel to mesh into it, in order to rotate said cylindrical object, in this text referred to as reel (3), a holding plate (4), wherein the sun wheel (2) and the reel (3) are manufactured in order to allow the sun wheel (2) to mesh into the reel (3), thereby rotating it.

12 Claims, 4 Drawing Sheets

(58) Field of Classification Search
CPC . H01L 21/68; B05B 13/0228; B05B 13/0242; B05B 13/025
USPC .................................. 269/903; 118/320, 500
See application file for complete search history.

(56) References Cited

FOREIGN PATENT DOCUMENTS

DE      102013012717 A1 * 2/2015 ........... C23C 14/505
EP         2048263 B1    3/2011

* cited by examiner

FIXTURE TO BE USED IN PVD PROCESSES FOR CYLINDRICAL, ELONGATED SUBSTRATES

TECHNICAL FIELD

The present invention relates to a fixture to be used in a physical vapour deposition (PVD) process in order to treat cylindrical, extended work pieces. In the context of the present invention the term work piece also includes tools, e.g. cutting tools. The inventive fixture is suitable to coat work pieces made of any substrate, which is suitable to be coated using PVD processes, and with any kind of coating system, which can be produced using PVD processes. The inventive fixture is especially suitable for coating substrates using Cathodic Arc Deposition and Sputter Deposition processes of any kind.

STATE OF THE ART

From the state of the art it is known to pre-treat, coat and post-treat a work piece in a vacuum chamber of a vacuum treatment system, in order to improve certain properties of said work piece. These properties include resistance against abrasive wear and corrosive wear, but are not limited to such. Coating processes used for this purpose include thin-film deposition methods such as e.g. PVD, CVD, PACVD, but also thick-film deposition methods, and are not limited to such. Before a PVD coating is deposited, the work pieces must be carefully cleaned, in order to ensure a reliable adhesion and uniformity of the coating on all work pieces. Proven methods of pre-treatment, that increase the adhesion of a coating to the substrate, include heating by electron bombardment, as known from DE3330144, sputter etching with noble gas ions, and etching the work pieces with reactive chemistry. PVD techniques include Cathodic Arc Deposition, Electron Beam Physical Vapour Deposition, Evaporative Deposition, Close-Space Sublimation, Pulsed Laser Deposition, Sputter Deposition, Pulsed Electron Deposition and Sublimation Sandwich Method. Furthermore, the work pieces can be post-treated, e.g. by polishing the surface and thereby removing droplets, which are commonly formed during Cathodic Arc Evaporation, and improving anti-friction behaviour. These enumerations of methods to pre-treat, coat and post-treat work pieces are however non-exhaustive.

PVD deposition techniques, such as e.g. Cathodic Arc Evaporation or Sputter Deposition (sometimes also referred to as Sputtering), are performed in a vacuum chamber of a vacuum treatment system. As mentioned above, PVD is a method to deposit thin-films on the surface of a substrate. The use of PVD methods is generally suitable to deposit coatings, which exhibit a thickness of some µm, preferably between 1-50 µm.

In order to attain a distribution of coating thickness and quality which is as uniform as possible, it is crucial to control the movement of the work pieces past treatment sources and etching sources. Parts to be pre-treated, coated and/or post-treated are often fastened to individual work piece holders that are disposed symmetrically around the system axis, or rotatably mounted on a carousel-like work piece support. Known industrial equipment usually uses work piece holders or carousel-like work-piece supports that are connected rotatably with the vacuum chamber, typically with the bottom of the vacuum chamber.

A uniform treatment respectively a uniform coating thickness of the work pieces to be treated, is often obtained by using a work piece carrier device with a threefold motion. Therefore, a first system is provided, which is rotatable about a central axis with respect to the installation. The first rotational system is denoted in the following as sun system. With respect to the sun system, a second rotational system is provided on the latter, with rotational axis offset parallel with respect to that of the sun system. The second rotational system is denoted in the following as planetary system. On the planetary system a third rotational system is provided, referred to in the following as moon system, with rotational axis parallel to the planetary system and the sun system. The connections between sun system, planetary system and moon system are often realized through forced connections and gearing mechanisms. The moon system can be set into rotational motion intermittently or continuously.

In U.S. Pat. No. 6,620,254 Zaech and Kunz disclose a work piece support for vacuum treatment, and in particular vacuum coating installations, exhibiting a threefold motion. The sun system is rotatable about an axis and with respect to the installation and coupled to an apparatus-side drive. A second rotational system, called planetary system, with rotational axis offset, and parallel with respect to that of the sun system, is provided with a driving coupling with respect to the apparatus. A third rotational system, called moon system, with rotational axis parallel to that of the sun system and the planetary system, is rotatably mounted and exhibits a driving connection to the moon system. The driving connection is established in a way, which leads to uninterrupted operation. Due to forced connections and gearing mechanisms, the disclosed work piece support exhibits the characteristic motion of the moon system during operation, known to any person skilled in the art.

In EP2048263B1 Esser and Zaech disclose a work piece carrier device with a setup, that offers the possibility to change the gear transmission ratio in an easy way. The main advantage of the disclosed work piece carrier is the easy actuation mechanism and at the same time ability to change the gear transmission ratio. The base frame is rotatable around a main axis and is powered by one electric motor. The actuation is not done by using a central actuator. Instead, a torque proof gear wheel is fixed on the pivot mounting, another gear wheel is mounted on the carousel's periphery. The two rack-wheels gear into each other. The motor powers the gear wheel on the carousel's periphery, and thus the work piece carrier is rotated. The work piece holders are connected to the central axis via rack-wheels in a way, which leads to a forced rotation of the work piece holders. This type of setup leads to a continuous rotation of the work pieces, which is especially important for the deposition of thin multilayer coatings. The gear transmission ratio can be adjusted by changing the size, respectively the number of teeth on the gear wheels.

As in the patents cited above, and for elongated work pieces, the work piece holders are often mounted on the moon system in such a way, that the work pieces are positioned vertically. Say the axis in direction of the elongation of the work pieces is parallel to all of the rotation axis of the moon system described in said patents.

If the size of the work pieces is sufficiently small, the carrier structure can be equipped with vertically equally distributed tables, in order to coat as many work pieces as possible in just one work piece batch. Obviously, this is limited by the size and elongation of the work pieces.

If cylindrical work pieces with a large diameter have to be evenly treated on their whole surface, a problem arises: The quality of the treatment at the frontal area is not the same as at the lateral area. In order to avoid this problem, work pieces of this kind are usually mounted on specified work piece holders, which incline the work pieces about a certain angle with reference to the central axes around which the work piece holders are rotated. Although other angles can be used, an inclination of 45° was found to produce the best treatment quality. The overall rotation of the work piece can then be described as a double rotation of the work piece: The first rotation is the one of the work piece, which is centrally mounted on a spindle, and the second rotation is that of the carousel, to which the spindle is mounted.

Problem to be Solved

Due to the elongation of some work pieces and due to the design of state of the art fixtures, the amount of work pieces that can be treated in a vacuum chamber of a vacuum treatment system is limited. The length of the elongated work pieces to be inserted into a vacuum treatment chamber is highly dependent on the angle about which said elongated work piece is inclined. State of the art fixtures are often designed in order to obtain an inclination angle of 45° for the work pieces, since this angle was found to be ideal for coating processes. However, tilting elongated work pieces about an angle of 45° leads to a lack of space in the vacuum chamber of such a vacuum system, and thereby extremely limits the amount of such work pieces, which can be loaded and treated in said vacuum chamber at the same time.

Objective of the Invention

The present invention aims to provide a fixture for cylindrical, elongated work pieces, which allows to treat the lateral area and the frontal area of the work pieces at the same time. Furthermore, it is an objective of the present invention to provide a fixture, which allows to treat work pieces which are further elongated than work pieces which could be treated with state of the art fixtures, in particular when using a coating chamber with a given size and a given volume, the work pieces in the invention can be further elongated compared to the work pieces in the state of the art. In order to decrease the production costs, it is another objective of the present invention to increase the amount of said elongated work pieces, which can be inserted into the vacuum chamber of a vacuum system at one time.

Solution of the Problem According to the Present Invention—Description of the Present Invention These aims are achieved by the present invention, in that a fixture for cylindrical, elongated work pieces is provided. The double inclination of the inventive fixture, both in radial and in rotating direction leads to a smaller volume being occupied by each elongated work piece, thereby allowing the vacuum chamber of the vacuum system to be loaded with bigger work piece batch sizes, while working in an economically viable way. Furthermore, the design of the inventive fixture allows to insert even further elongated work pieces, which cannot be loaded into the vacuum chamber with current state of the art fixtures. In addition, the rotation of the inventive fixture allows an even distribution of coating thickness throughout the lateral area and the frontal area of the work pieces.

LABELLING OF FIGURES

1 Spindle
2 Sun wheel
3 Rotation sleeve/Reel
4 Holding plate
5 Support plate
6 Slot
7 Rotational Axis of the Sleeve 3
8 Rotational Axis of the Spindle 1
9 Central Part
10 Arm
11 Longitudinal arm direction
12 Hand
13 Longitudinal hand direction
15 Carousel
16 PVD coating chamber
α Angle between the arms
β Angle between the hand and the arm
γ Inclination angle of the rotation axis of the reel (respectively the substrate) with respect to the central part of the holding plate (respectively the plane B).
B Plane, which lies in a 90° angle with reference to the spindle, and overlaps with the central part of the holding plate

IMPLEMENTATION OF THE PRESENT INVENTION

Figure 1:
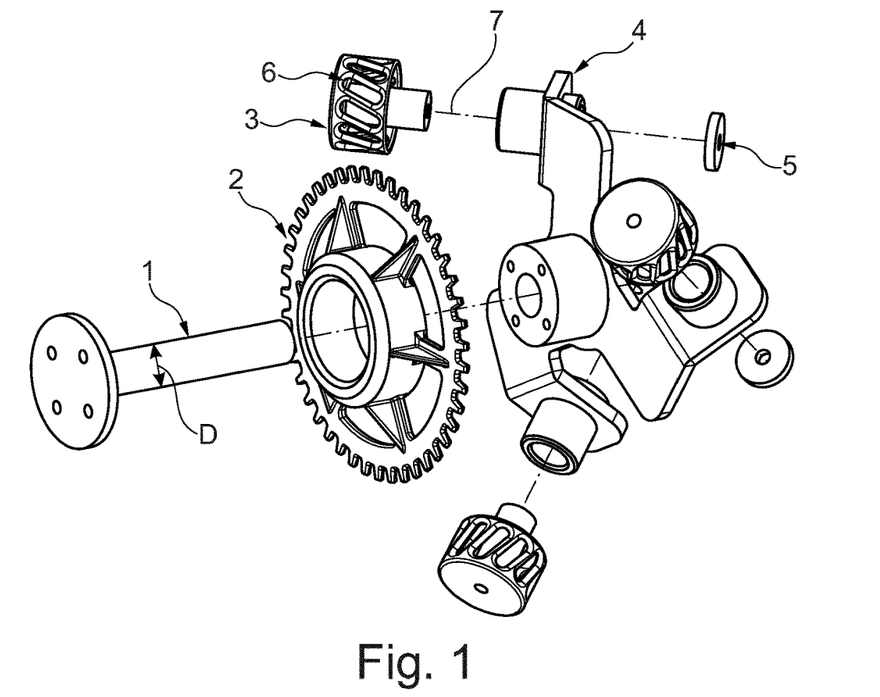
FIG. 1 Exploded view drawing of the inventive fixture
FIG. 2 View of one embodiment of the inventive fixture from above
FIG. 3 Side view of one embodiment of the inventive fixture
FIG. 4 Bird's eye view of one embodiment of the inventive fixture
FIG. 5 One preferred aspect of the present invention, where multiple inventive fixtures are mounted on a spindle in a stacked way
FIG. 6 Schematic sketch of a PVD coating chamber comprising a carousel and spindles
FIG. 7 Schematic view of one embodiment of the inventive fixture showing a maximum enveloping cylinder diameter Dx

In the context of the present invention, a rotation sleeve, herein also denoted as a reel 3 shown in FIG. 1, is preferably defined as a cylindrical object. In other embodiments that are not shown in the figures the rotation sleeve can also have another shape, for example a cone, a sphere, etc. It can also have a combination of shapes, for example a cylindrical object combined with a conical object. The rotation sleeve as a cylindrical object comprises a bottom, a top and a wall. The wall, also called lateral area connects the bottom with the top. In the embodiment shown in this invention, the rotation sleeve is hollow. In other embodiments the rotation sleeve can also be filled with material. Preferably, the rotation sleeve is made of a single material, but can also be made of different parts comprising the same or also different materials.

The rotation sleeve exhibits properties that allow a gear wheel to mesh into it, in order to rotate said rotation sleeve, which is preferably a cylindrical object. This can e.g. be realized as a cylindrical object exhibiting slots 6 along its lateral area, which are manufactured in order to allow a suitable gear wheel to mesh into these slots 6. The slots 6 preferably extend along almost the whole length of the wall, in particular the slots 6 extend along more than 70%, preferably more than 75%, preferably more than 80 and most preferred more than 90% of the height of the wall. The slots 6 are preferably arranged symmetrically around the rotational axis 7 (FIGS. 1 and 5) of the rotational sleeve 3. The slots 6 have the shape of elongated holes, also called long holes, oval holes or long slots. The elongated direction, which is the direction of the longest extension of the slot 6, is inclined to the rotational axis 7 of the rotational sleeve 3. The inclination is dependent on the inclination of parts of a holding plate 4, for example a hand 12, which will be explained later on.

Each rotation-sleeve comprises at least four, better at least six, better at least eight, and even better more than ten slots 6. Furthermore, in the context of the present invention, a sun wheel is defined as a gear wheel in a first rotatable system, denoted as a sun system.

The present invention discloses a fixture to be used in a vacuum chamber of a vacuum treatment system, in order to preferably treat elongated, cylindrical work pieces. Of course other, maybe not elongated work pieces or work pieces that have a shape that is non cylindrical can also be treated. Work pieces, which can be coated using the inventive fixture, include sanitation parts, e.g.

Taps
Tap bodies
Spouts
Pump operator heads
Caps
Dispenser Bodies, e.g. soap dispensers
Coat hook bodies
Toilet roll holder bodies The work pieces, also called substrates, which can be coated using the inventive fixture are however not limited to said list. Furthermore, the inventive fixture allows to coat substrates of different sizes at the same time.

The inventive fixture comprises a spindle 1, a sun wheel 2, a holding plate 4 and a reel 3. A work piece holder, which is not shown in the figures, is adaptively mountable on the reel 3. The at least one reel 3 and thus the at least one substrate is inclined in radial and rotational direction, which will be explained in more detail later.

Figure 5:
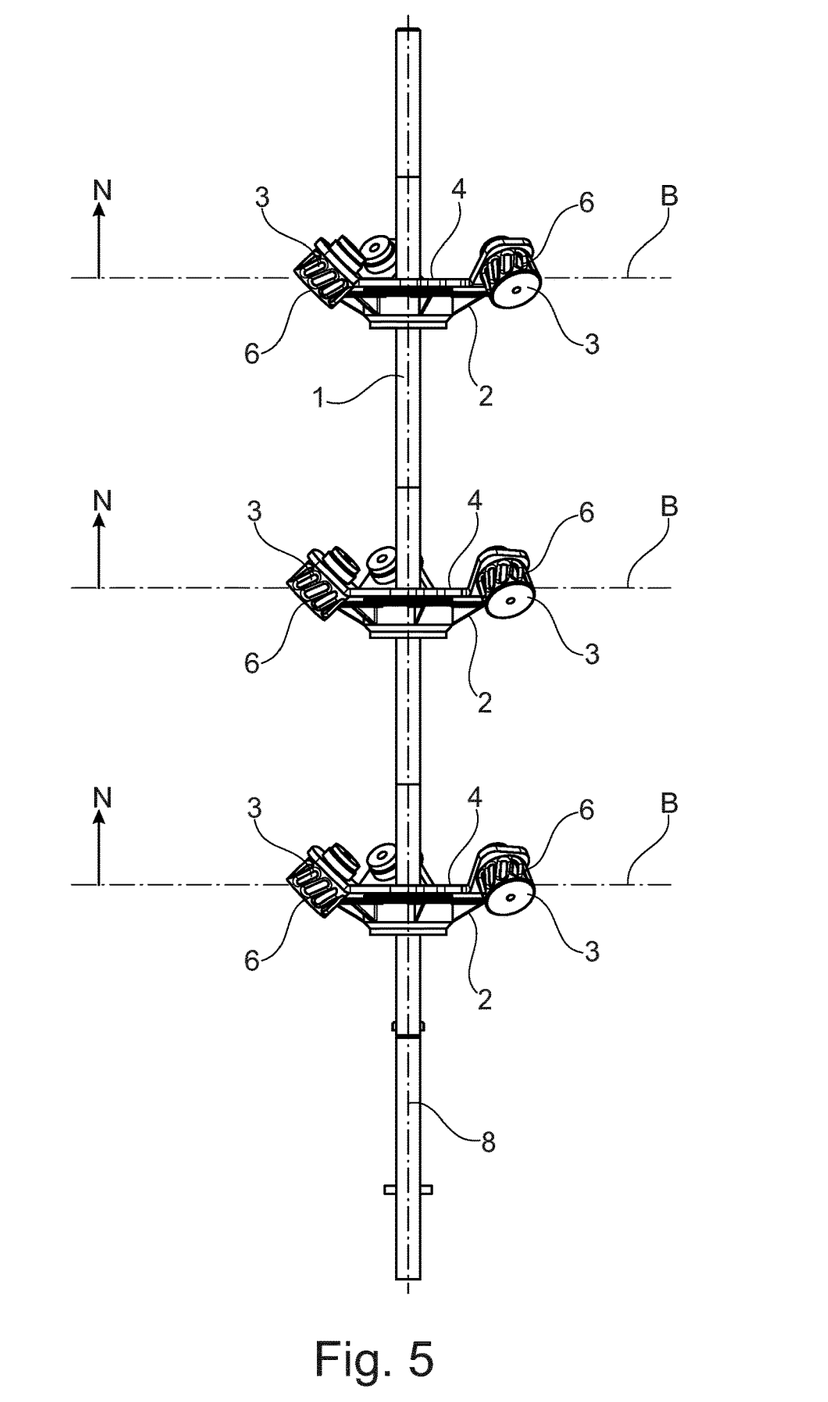

As can be seen in FIG. 5, many holding plates 4 can be mounted on the spindle 1. For easier explanation, in the following, the only one holding plate 4 is exemplarily described, as shown in FIGS. 1 to 4. The at least one holding plate 4 is mounted to the at least one spindle 1. The holding plate is preferably mounted to the spindle 1 by using a clamping. However multiple holding plates 4 (FIG. 5) can be mounted to the same spindle 1 by stacking them in a vertical way. By vertical way it is meant that the holding plates 4 are stacked over each other along the rotational axis 8 of the spindle 1 (FIG. 5). If multiple holding plates 4 are stacked in this way, as well as the number of holding plates 4, which can be stacked, depends on the substrate length. In other words, the distance between two holding plates 4, measured in parallel to the rotational axis 8 of the spindle 1, is smaller for shorter substrates than the distance for longer substrates.

In this text, the part of the holding plate 4, where the holding plate 4 is mounted to the spindle 1 is referred to as the central part 9 of the holding plate 4. The central part 9 of the holding plate 4 is preferably a flat plate, but could have a cylindrical shape. The central part 9 of the holding plate 4 is preferably rotationally symmetrical to the rotational axis 8 of the spindle 1, when mounted to the spindle 1. The central part 9 of the holding plate 4, if mounted to the spindle 1, lies in a plane B (FIG. 5), wherein the normal N of the plane B is parallel to the rotation axis 8 of the spindle 1.

Besides the central part 9, the holding plate 4 comprises at least one part facing approximately radially outwards from the center, in the following this part is called arm 10. The arm 10 is extending in a longitudinal arm direction 11. The longitudinal arm direction 11 in this embodiment is the main direction of the elongation of the arm 10. The longitudinal arm direction 11 can, however, also be defined as the direction that originates at the rotational axis 8 of the spindle 1 and elongates radially. The arms 10 are attached to the central part 9 rotationally symmetrically. Therefore, the angle between two longitudinal arm directions 11 of two arms 10 that lie next to each other is 360° divided by the number of arms 10. In the shown embodiments, the holding plate 4 comprises three arms 10, therefore the angle between two arms 10, more precise the angle between the longitudinal arm directions 11 of two neighbouring arms 10, is 120°. The longitudinal arm direction 11 exhibits an angle of approximately 90° with reference to the rotation axis 8 of the spindle 1.

Figure 2:
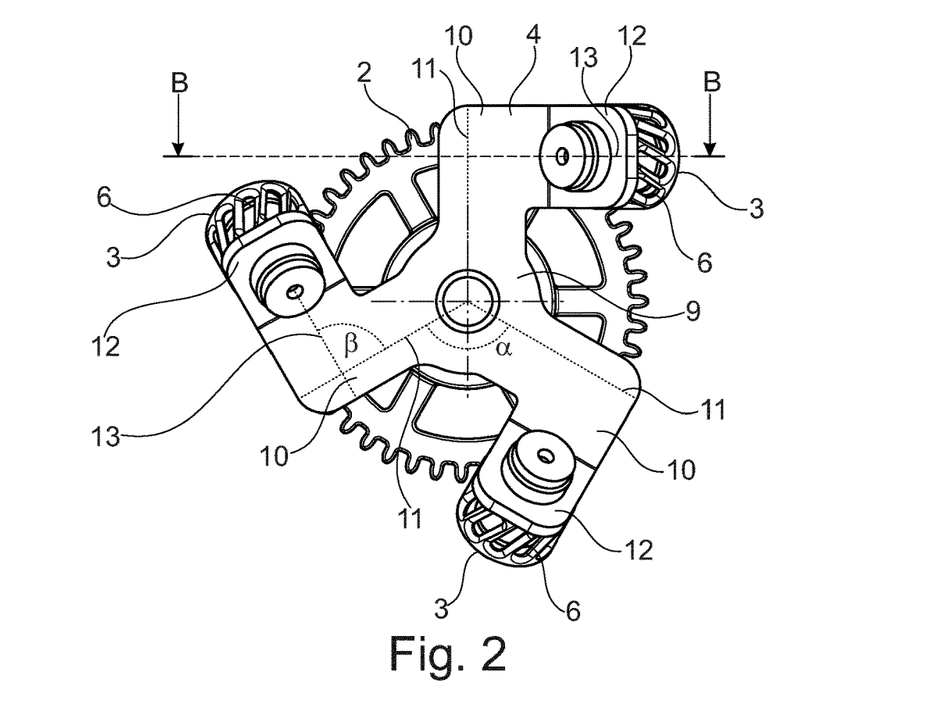

As explained before, the holding plate 4 can comprise more than one arm 10, preferably between 2 and 10 arms 10. Attached to the arm 10 is another part of the holding plate 4, which is herein referred to as hand 12. The hand 12 is extending in a longitudinal hand direction 13. The longitudinal hand direction 13 in this embodiment is the main direction of the elongation of the hand 12 in the plane of the central part 9. The hands 12 are attached via the arms 10 to the central part 9 rotationally symmetrically. The longitudinal hand direction 13 exhibits an approximately 90° angle to the longitudinal arm direction 11 attached to the holding plate 4, as can be seen in FIG. 2. In other embodiments it can be preferable that this angle is between 70° and 110°. In preferred embodiments it can be preferable that this angle is between 50° and 130°. Again, this angle is measured in the plane of the central part 9, for example the plane B.

Figure 3:
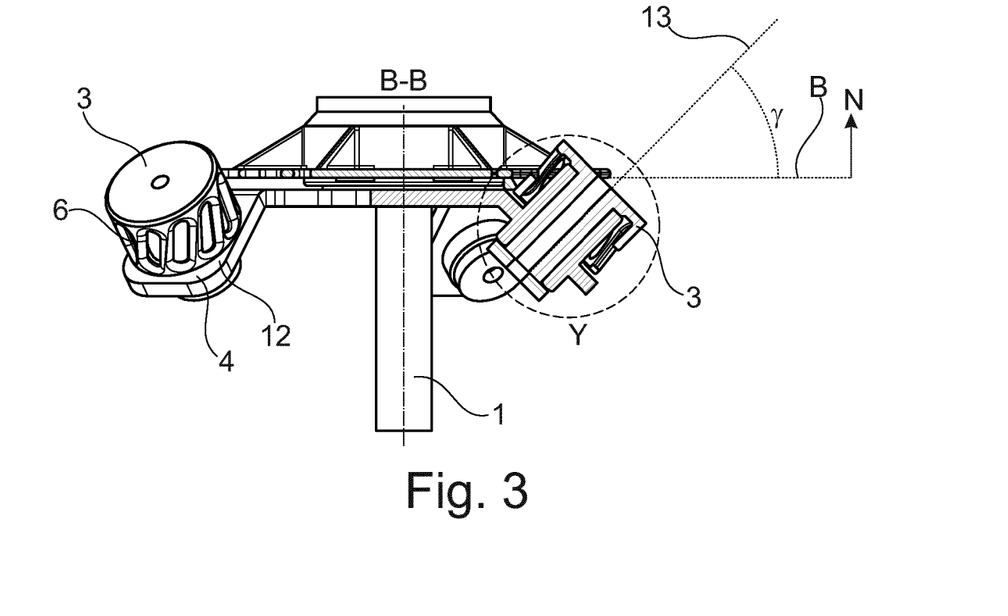
Figure 4:
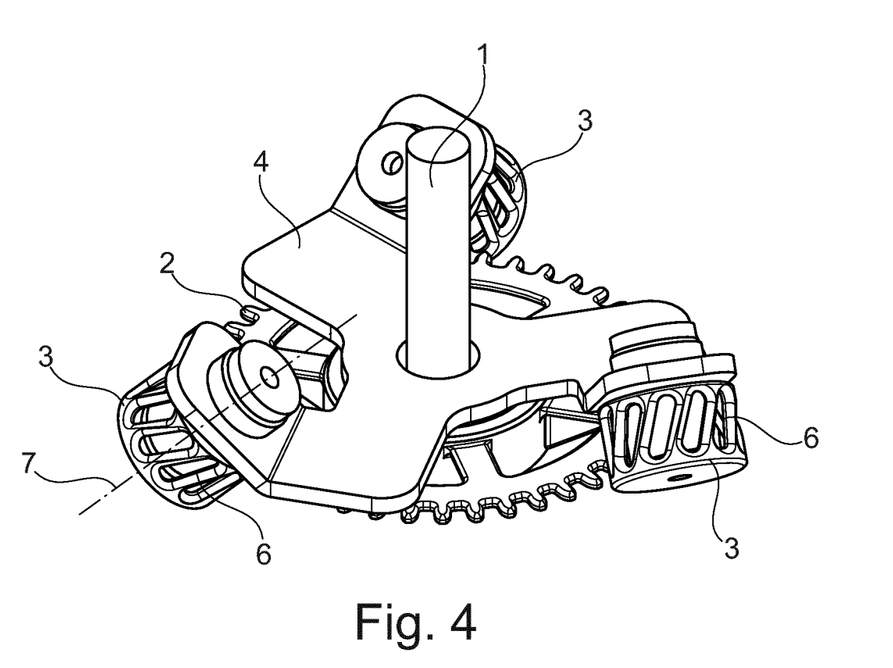

Furthermore, the hand 12 directs outwards of the plane B of the central part 9, which can be well seen in FIGS. 5 and 3. In manufacturing words, the hand 12 is bent from the arm 10. The hand 12—is directed along the tangent of the sun wheel 2, which will be described later in this text. Furthermore, the longitudinal hand direction 13—outside of the plane B is inclined about between 20°-70°, preferably about 45° to the plane B, or, in other words, between 70°-20°, preferably about 45° to the normal N of the plane B. The coating quality shows a maximum at this angle, with reference to the plane B of the central part 9 of the holding plate 4 (in all the figures denoted as B). The arm 10 of the holding plate 4 includes measures, which allow to mount a reel 3 on it. Changing the type of holding plate 4 (for example changing the number of arms 10 and thereby also changing the number of hands 12), and thus the number of the reels 3, allows adapting the inventive fixture to different amounts of substrates.

The reel 3 fulfills the function of a bevel gear wheel and a planet gear, both at the same time. Substituting the bevel gear wheel and the planet gear by the reel 3 ensures a compact and light construction, in comparison to state of the art fixtures. Furthermore, less parts are needed to build a reel 3 of said kind, compared to state of the art fixtures using a bevel gear wheel and a planet gear, leading to an overall reduced complexity of the inventive fixture.

The reel 3 comprises measures, which allow the sun wheel 2 to gear into the reel 3, leading to a rotation of the reel 3, when the sun wheel 2 is rotated. This can e.g. be realized by slots along the circumference of the reel 3, or by protruding parts, as in a state of the art gear wheel, but is not limited to such. Preferably, inclined slots run along the circumference of the reel 3, to allow the sun wheel to gear into it and thereby rotate the reel. The reel 3 is manufactured with defined angles and radii in order to ensure an ideal operation on the sun wheel 2. This benefits a continuous, homogenous coating of the lateral area and the frontal area of the work piece.

The sun wheel 2 is a gear wheel, which is mounted to the spindle and manufactured in order to gear into the reel 3, thereby rotating it. During operation, the sun wheel 2 is interlocked externally. The locking can be done for example by a bolt. Another example of locking could be a small brake, similar to a hand brake of a vehicle. A further example of locking could be that a sheet metal is fixed at the sun wheel 2, in particular, the sheet metal is screwed on the sun wheel 2, alternatively welded, glued, soldered, etc. The sheet metal comprises preferably a sheet metal arm, which is preferably attached to the sheet metal. Preferably sheet metal arm and sheet metal are one-piece. The sheet metal arm preferably is braced by a central rod of the carousel. Thus, the blocking can be realized. If multiple holding plates are stacked to one spindle 1, then multiple sun wheels 2 are needed. More precisely, one sun wheel 2 is needed to rotate one or more reels 3 of one holding plate 4.

Figure 7:
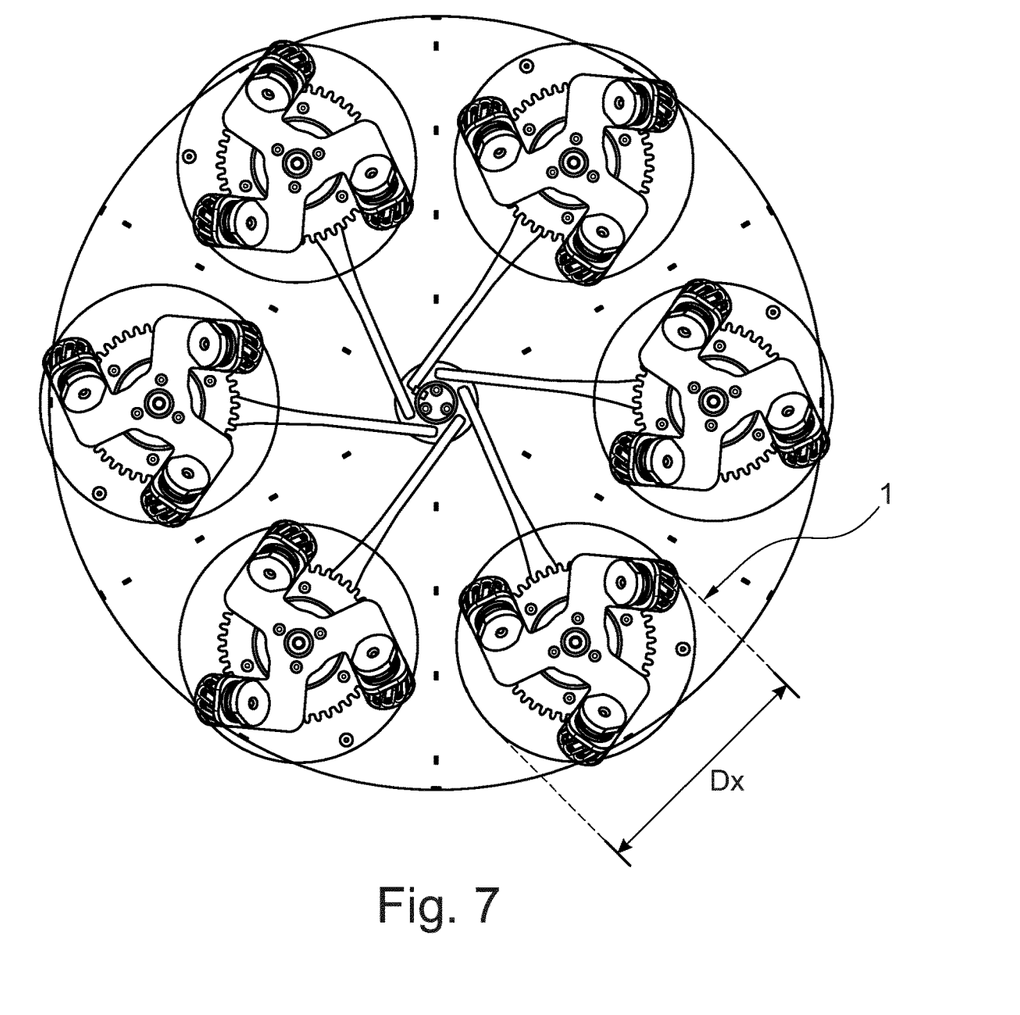

The sun wheel 2 and the reel 3 form a special kind of sun- and planet-combination, as known from state of the art. But since the at least one reel 3 is tilted with reference to the sun wheel 2, the accommodation of even further elongated work pieces, than known from state of the art fixtures, becomes possible. Furthermore, the inclination of the reel 3 is needed in order to obtain an even coating distribution throughout the lateral area and the frontal area of the work pieces. An adaptive construction of the sun wheel 2 and reel 3 allows work pieces of various sizes to be treated in a vacuum chamber. The gear transmission ratio of the sun wheel 2 and the reels 3 can be adjusted by changing their diameters. The gear transmission ratio i=sun wheel:reel is preferably chosen to be $1:2 < i < 1:10$. For using the inventive substrate fixture within a coating chamber, the limiting factor in changing said diameters can be, preferably is, the maximum enveloping cylinder diameter Dx of the spindle 1 (FIG. 7). With the term "the maximum enveloping cylinder diameter of the spindle, it is particularly meant the maximum enveloping cylinder diameter Dx of each spindle of the carousel that one can use in order to hold the maximal quantity of substrates (work pieces) for conducting a treatment (e.g. coating process) within the coating chamber. In this embodiment the enveloping circle, or speaking in three dimensions (as already referred to above) the enveloping cylinder, is the space in which the substrates to be coated may be arranged. Hypothetically if one goes outside this circle/cylinder, the substrates from two different spindles of the carousel would collide. In general the diameter of the enveloping circle/cylinder can vary from plant to plant, as each plant preferably can have its own carousel. In FIG. 7, it is shown what should be understood as the maximum enveloping cylinder diameter Dx in the context of this embodiment. The maximum enveloping diameter D of the spindle 1 (compare FIG. 1) is consequently smaller than the maximum enveloping cylinder diameter Dx (compare FIG. 7).

To every reel 3 one work piece holder (not shown in the figures) is mountable. Adaptive mounting of a work piece holder onto the reel 3 allows varying the kind of substrates to be treated in different batches. Furthermore, the work piece holder can be easily exchanged in order to accommodate different work pieces of varying size and shape, and mounted on the reel 3 within a short time.

Figure 6:
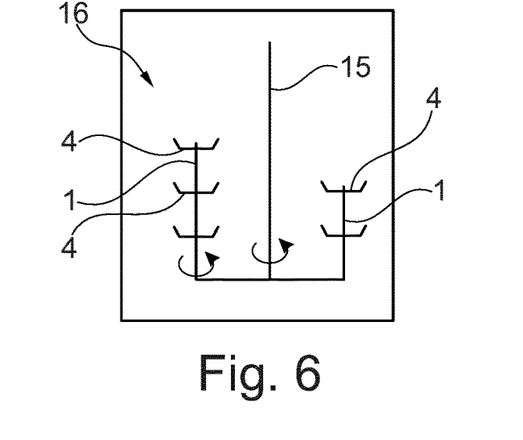

The one or more holding plates 4 are mountable onto the spindle 1, and said spindle 1 is mountable onto a carousel 15 (FIG. 6). Either one or multiple spindles 1 of said kind can be mounted onto the carousel 15. As described, the inventive fixture is denoted as the first rotatable system. The holding plate 4 is fixed to the spindle 1, preferably by clamping. By actuating the spindle 1, the holding plate 4 is forced to rotate. The sun wheel 2 is externally blocked during the actuation of the spindle 1, thereby leading to a rotation of the reels 3, the third rotation of the system. In this first rotatable system, the sun wheel 2 relates to the sun, the rotation of the holding plate 4 around the spindle 1 relates to a planetary rotation, and the rotation of the tilted reel around its central axis relates to the rotation of the moon. The rotation of the carousel 15 to which the spindle 1 is mountable, is denoted as the second rotatable system. The rotation of the carousel 15 can either be in clockwise direction or in anti-clockwise direction. The rotating direction of the carousel 15 has no influence on the coating quality. The same holds true for the spindle 1 and thus the fixture.

An embodiment of the invention will be described by way of example, which is meant to be merely illustrative and therefore non-limiting.

According to one aspect of the present invention, the inventive fixture is mounted in a vacuum chamber 16 of a vacuum treatment system, which is used to perform pretreatment, post-treatment and/or PVD processes on a work piece. Said processes especially comprise ion etching, Cathodic Arc Deposition and Sputtering.

According to another aspect of the present invention, multiple reels 3 are mounted on the holding plate 4. The holding plate 4 then has to be manufactured in order to accommodate the desired number of reels 3. The number of reels 3, which are mounted on the holding plate 4, depends on the size of the substrates. The number n is preferably chosen to be $2 \leq n \leq 10$. Most preferably, the number of reels is chosen to be $3 \leq n \leq 5$.

According to a preferred aspect of the present invention, which can be seen in FIG. 5, multiple inventive fixtures are mounted on the spindle 1 in a stacked way, in order to allow a high amount of substrates to be coated at the same time. How many inventive fixtures can be stacked on one spindle depends on the size of the work pieces, which are to be coated.

According to a preferred aspect of the present invention, the manufacturing method for the reel 3 comprises a process step, where an additive process is used for building the reel. These additive processes comprise (Selective Laser Melting (SLM) technique, Conventional or Computerized Numerical Control (CNC) turning or milling, Laser Cutting (e.g. Trumpf Rotoplas)). Most preferably, the reel 3 is manufactured using only additive processes. Manufacturing the reels 3 using additive manufacturing methods preferably leads to a cost reduction and process optimization.

According to one aspect of the present invention, the sun wheel 2 is made of a metallic material. In contrast to plastic material, metallic material does not gas out while increasing the operating temperature. The sun wheel 2 is preferably made of stainless steel. Stainless steel exhibits a good electrical conductivity, is non-magnetic and stainless. This material shows good temperature stability and also mechanical stability within the defined operating parameters.

According to another aspect of the present invention, the sun wheel 2 is manufactured using water jet cutting, laser cutting, Computerized Numerical Control (CNC) or conventional turning or milling. The sun wheel 2 is preferably manufactured using water jet cutting, since water jet cutting allows to lower the development effort and thus decreases the costs.

According to another aspect of the present invention the holding plate is made of a metallic material. The security plate is preferably made of 1.4301 stainless steel. This type of stainless steel shows advantages such as weldability, ease of formability, it is not magnetic and has a good machinability.

Another preferred embodiment of the present invention is described in the following. An exploded view of said preferred embodiment is shown in FIG. 1. Different perspectives of this preferred embodiment of the inventive fixture are given in FIGS. 2 to 4. The sun wheel 2 is made of 1.4301 stainless steel and is preferably manufactured using laser cutting due to low manufacturing costs. However, manufacturing methods such as turning, milling and waterjet cutting can be used. Said sun wheel 2 is rotatably mounted onto the spindle 1. A holding plate 4, made of 1.4301 stainless steel, is then fixated to the spindle 1 of the carousel 15 via clamping. Using bearing sleeves, the holding plate 4 can accommodate the reels 3. In this embodiment the holding plate 4 is manufactured with three arms 10, and thus three hands 12, in order to accommodate three reels 3. This leads to an angle $\alpha=120°$ between the arms 10. As described, $\beta$ is in this embodiment always approximately 90°, but can be between 70° and 110°, between 60° and 120°, or between 50° and 110° in further embodiments. The reels are mounted on the securing plate in such a way, that each of the reels 3 exhibits an angle of $\gamma=45°$ with reference to the central part 9 of the securing plate (respectively the plane B). The reels 3 can be additively manufactured, e.g. using Selective Laser Melting (SLM) technique, which leads to an increase in investment considering the manufacturing engineering. However, the reels 3 can also be manufactured using Computerized Numerical Control (CNC) technology. The reels 3 are manufactured with inclined slots 6 running along the circumference of the reel 3. The inventive fixture is then mounted to the spindle 1. As shown in FIG. 5, multiple fixtures can be stacked on the spindle 1. In this embodiment, for example, if the maximum enveloping cylinder diameter Dx of each spindle of the carousel is about 180 mm or greater, then the maximum enveloping diameter D of the spindle 1 can be chosen to be about 15 mm or greater. Preferably the maximum enveloping cylinder diameter Dx of each spindle of the carousel is about 180 mm or preferably greater. Preferably the maximum enveloping diameter D of the spindle 1 can be chosen to be about 15 mm or preferably greater. These ranges of dimensions are only examples and should not be understood as any limitation of the invention.

According to one aspect of the present invention, the fixture can be rotated externally by using a spring, causing an intermittent rotation instead of the continuous rotation introduced by an actuator.

Further preferred embodiments of the present invention are described in the next passages:

Preferably, the holding plate comprises a central part, which lies in a plane (B), with (B) exhibiting an approximately 90° angle with reference to the rotation axis of the spindle, and a part, which also lies in the plane (B) and therefore also exhibits an angle of approximately 90° with reference to the rotation axis of the spindle, facing approximately radially outwards from the central part, herein referred to as arm, and a part attached to the arm, herein referred to as hand, exhibiting an approximately 90° angle with reference to the arm, and an inclination ($\gamma$) of between 20°-70° with reference to the plane (B), and including measures, which allow mounting of a reel to the hand.

Preferably, multiple holding plates and the same amount of sun wheels are mounted to a spindle in a stacked way, ideally every sun wheel is adjusted to the at least one reel of one holding plate.

Preferably, the longitudinal arm direction exhibits about 90° to the rotation axis of the spindle (1).

Preferably, a longitudinal direction in this disclosure means the main direction of a part, i. e. of the arm, or of the hand. The arm and the hand are parts of the holding plate (4), meaning that the arm is preferably a plate and that the hand is preferably a plate. The longitudinal direction lies within the plane of the plate. The arm preferably has a longitudinal shape. The longitudinal direction of the arm extends along the longitudinal shape. The hand preferably has a longitudinal shape. The longitudinal direction of the hand extends along the longitudinal shape.

Preferably, one end of the arm is attached to the central part. Another end of the arm is attached to the hand.

Preferably, the holding plate (4) is made of a single part, which includes the central part, the arm and the hand.

Preferably, the reel (3) has a cylindrical shape with a bottom, a top and a wall that links the bottom to the top. Preferably, the inclined slots are arranged at the wall. Preferably, the reel (3) is a hollow cylinder.

The reel (3) preferably comprises at least partially additive manufactured material.

Preferably, the rotational speed of the substrates is the speed with which the substrates turn around their own rotational axis.

Finally, one can give an alternative description or characterization for the invention for which independent protection is sought:

A fixture system to be used in a vacuum chamber of a vacuum treatment system comprising a spindle, a gear wheel (sun wheel), a cylindrical object exhibiting properties that allow the said gear wheel to mesh to it in order to rotate said cylindrical object, characterized in that the system is designed that way that the sun wheel rotates the said cylindrical object (can be called "reel") around an axis that represents a line that is arranged in a crookedly inclined manner relative to the line of rotation of the sun wheel and that does not intersect the line of rotation of the sun wheel.

For the aforementioned construction protection is claimed independently or in combination with other additional features of the existing claims or of the specification.

Here and in general it is preferred that the system comprises a number of sun wheels and reels belonging thereto which are mounted one above the other along a spindle as shown by FIG. 5 which is representative for all possible variants.

Independent from the above-mentioned embodiments and independent from the claims, independent protection is also sought for an embodiment characterized with the following features:

A fixture system to be used in a vacuum chamber 16 of a vacuum treatment system, comprising,
  a spindle 1,
  a gear wheel, in this text referred to as sun wheel 2,
  a cylindrical object exhibiting properties that allow the gear wheel to mesh into it, in order to rotate said cylindrical object, in this text referred to as reel 3,
  a holding plate 4,
  whereas the holding plate 4 is mounted to the spindle 1,
    the sun wheel 2 is rotatably mounted to the spindle 1 and during operation interlocked externally, preferably so that the spindle 1 does not rotate the sun wheel 2, and the reel 3 is mounted to the holding plate 4 and provides measures, which allow mounting of a work piece holder to the reel 3, characterized in that the holding plate 4 comprises a central part 9, which lies in a plane B, wherein the normal N of the plane B is parallel to the rotation axis of the spindle 1, wherein the holding plate 4 comprises an arm 10 that is extending in a longitudinal arm direction 11, wherein the arm 10 is attached to the central part 9 and wherein the arm 10, preferably the longitudinal arm direction 11, faces approximately radially outwards from the central part 9, wherein the arm 10, preferably the longitudinal arm direction 11, lies in the plane B so that preferably the central part 9 and the arm 10, preferably the longitudinal arm direction 11, exhibit an angle of approximately 90° with reference to the rotation axis 7 of the spindle 1, wherein the holding plate 4 comprises a hand 12 that is extending in a longitudinal hand direction 13, wherein the hand 12 is attached to the arm 10 and wherein the hand 12, preferably the longitudinal hand direction 13, exhibits an angle between 50° and 130° with reference to the arm 10, preferably the longitudinal arm direction 11, wherein the hand 12, preferably the longitudinal hand direction 13, exhibits an inclination of about 20° to 70° with reference to the normal direction N of the plane B, wherein the hand 12 includes measures, which allow mounting of a reel 3 to the hand 12, and in that the sun wheel 2 and the reel 3 are manufactured in order to allow the sun wheel 2 to mesh into the reel 3, thereby rotating it.

The invention claimed is:

1. A fixture system to be used in a vacuum chamber of a vacuum treatment system, comprising:
   a spindle,
   at least one gear wheel,
   at least one reel, wherein the at least one reel is a cylindrical object exhibiting properties that allow the at least one gear wheel to mesh into the at least one reel, in order to rotate said at least one reel,
   at least one holding plate,
   wherein the at least one holding plate is mounted to the spindle, the at least one gear wheel is rotatably mounted to the spindle and during operation interlocked externally, so that the spindle does not rotate the at least one gear wheel, and the at least one reel is mounted to the at least one holding plate, and a work piece holder is mounted to the at least one reel, and
   the at least one holding plate comprises a central part, which lies in a plane,
   wherein a normal of the plane is parallel to a rotation axis of the spindle, wherein the at least one holding plate comprises at least one arm that extends in a longitudinal arm direction, wherein the at least one arm is attached to the central part and wherein the longitudinal arm direction extends radially outwards from the central part, wherein the at least one arm lies in the plane,
   wherein the at least one holding plate comprises at least one hand that extends in a longitudinal hand direction, wherein the at least one hand is attached to the at least one arm and wherein the longitudinal hand direction exhibits an angle between 50° and 130° with reference to the longitudinal arm direction, wherein the longitudinal hand direction exhibits an inclination of about 20° to 70° with reference to the normal direction of the plane, wherein the at least one reel is mounted to the at least one hand, and
   the at least one gear wheel and the at least one reel are manufactured in order to allow the at least one gear wheel to mesh into the at least one reel, thereby rotating the at least one reel,
   wherein in operation, an axis of the reel does not intersect a line of rotation of the gear wheel.

2. The fixture system according to claim 1, wherein the longitudinal hand direction exhibits an approximately 90° angle with reference to the longitudinal arm direction.

3. The fixture system according to claim 1, wherein the inclination of the longitudinal hand direction is approximately 45° with reference to the normal of the plane.

4. The fixture system according to claim 1, wherein properties of the at least one reel that allow the at least one gear wheel to mesh into the at least one reel in order to rotate the at least one reel, are inclined slots, which run along a circumference of the at least one reel.

5. The fixture system according to claim 1, wherein a gear transmission ratio i=gear wheel:reel is chosen $1:2<i<1:10$.

6. The fixture system according to claim 1, wherein the at least one holding plate accommodates a plurality of the reels.

7. The fixture system according to claim 1, wherein a manufacturing method for the at least one reel comprises an additive process for building the at least one reel.

8. The fixture system according to claim 1, wherein the at least one gear wheel is manufactured using water jet cutting, laser cutting, Computerized Numerical Control (CNC), or conventional turning or milling.

9. The fixture system according to claim 1, wherein at least two of the holding plates are mounted to the spindle, the same amount of gear wheels are rotatably mounted to the spindle, the at least two holding plates and the at least two gear wheels are mounted to the spindle in a stacked way, on each of said at least two holding plates is mounted at least one of the reels, wherein every one of the at least two gear wheels is adjusted to align with at least one of said reels.

10. The fixture system according to claim 9, wherein the fixture system comprises a first system of at least one of the gear wheels and at least one of the holding plates, with a gear transmission ratio j=gear wheel:reel, which differs from a gear transmission ratio i of a second system of at least one of the gear wheels and at least one of the holding plates, thereby allowing different substrates to be treated at the same time.

11. A fixture system to be used in a vacuum chamber of a vacuum treatment system comprising: a spindle, a gear wheel, a cylindrical object exhibiting properties that allow the gear wheel to mesh to the cylindrical object in order to rotate said cylindrical object,
   wherein the system is designed to have the gear wheel rotate said cylindrical object around an axis that represents a line that is arranged in an inclined manner relative to a line of rotation of the gear wheel and that in operation does not intersect the line of rotation of the gear wheel.

12. The fixture system according to claim 10, wherein the first system with the gear transmission ratio j that differs from the gear transmission ratio i of the second system allows different rotational speeds of the substrates to be treated at the same time.

* * * * *